United States Patent
Ko

(10) Patent No.: US 10,752,286 B2
(45) Date of Patent: Aug. 25, 2020

(54) STEERING CONTROL APPARATUS AND STEERING CONTROL METHOD

(71) Applicant: MANDO CORPORATION, Pyeongtaek-si, Gyeonggi-do (KR)

(72) Inventor: Sang Jin Ko, Daejeon (KR)

(73) Assignee: MANDO CORPORATION, Pyeongtaek-si, Gyeonggi-Do (KR)

( * ) Notice: Subject to any disclaimer, the term of this patent is extended or adjusted under 35 U.S.C. 154(b) by 205 days.

(21) Appl. No.: 15/372,393

(22) Filed: Dec. 8, 2016

(65) Prior Publication Data
US 2017/0183031 A1    Jun. 29, 2017

(30) Foreign Application Priority Data
Dec. 29, 2015 (KR) .................. 10-2015-0188885

(51) Int. Cl.
*B62D 6/00* (2006.01)
*B62D 5/04* (2006.01)

(52) U.S. Cl.
CPC ............ *B62D 6/008* (2013.01); *B62D 5/046* (2013.01); *B62D 5/0472* (2013.01); *B62D 6/002* (2013.01)

(58) Field of Classification Search
None
See application file for complete search history.

(56) References Cited

U.S. PATENT DOCUMENTS

| | | | | |
|---|---|---|---|---|
| 2010/0108432 A1* | 5/2010 | Okazaki | ............... | B62D 5/0463 180/446 |
| 2011/0071729 A1* | 3/2011 | Oblizajek | ............ | B62D 5/0472 701/41 |
| 2014/0316656 A1* | 10/2014 | D'Amato | ............. | B62D 5/0475 701/42 |
| 2015/0120140 A1* | 4/2015 | Kudo | ................... | B62D 5/0472 701/41 |
| 2017/0334481 A1* | 11/2017 | Sakaguchi | ............... | B62D 6/00 |

* cited by examiner

*Primary Examiner* — Tuan C To
*Assistant Examiner* — Kelly D Williams
(74) *Attorney, Agent, or Firm* — Hauptman Ham, LLP

(57) ABSTRACT

The present invention relates to a steering control apparatus and a steering control method for removing an inwardly caused disturbance or outwardly caused disturbance with respect to a vehicle. It is possible to efficiently remove a disturbance of a steering control apparatus which is generated due to various causes by: confirming a disturbance cause based on estimated frequencies estimated based on three factors that affect the steering control apparatus (i.e., a first estimated frequency estimated based on the estimation of a rack force, a second estimated frequency estimated based on a steering torque signal, and a third estimated frequency estimated based on a vehicle wheel rotational speed); then determining a compensation rate, which varies depending on whether the disturbance is an internally caused disturbance or an externally caused disturbance; and then applying the compensation rate to a steering current value.

12 Claims, 10 Drawing Sheets

STEERING CONTROL APPARATUS AND STEERING CONTROL METHOD

CROSS REFERENCE TO RELATED APPLICATION

This application claims priority from Korean Patent Application No. 10-2015-0188885, filed on Dec. 29, 2015, which is hereby incorporated by reference for all purposes as if fully set forth herein.

BACKGROUND OF THE INVENTION

1. Field of the Invention

The present invention relates to a steering control apparatus and a steering control method, and more particularly, to a technology of removing a disturbance generated inside or outside a vehicle.

2. Description of the Prior Art

An electric power steering apparatus of a vehicle includes a torque sensor configured to sense the torque of a steering shaft connected to a steering wheel, an electric motor linked with a steering output shaft or a rack bar to rotate/move the steering output shaft or the rack bar, a steering ECU configured to control the rotation of the electric motor according to a steering torque value measured by the torque sensor, and so on.

The electric power steering apparatus basically performs an operation of generating a steering assist current to be proportional to the steering torque according to a driver's operation of the steering wheel so as to rotate the electric motor. That is, the electric power steering apparatus performs a basic operation for assisting the user's steering force.

In such a steering control apparatus, an undesired disturbance component may be included between an input value and an output value due to various factors on both the inside and outside of a vehicle.

The term "disturbance" may be interpreted, in general technical meaning, as causing a change in a control amount in an automatic control despite not being a standard input, and such a disturbance may also occur in the steering control apparatus due to various causes.

The steering control apparatus should compensate for a steering control value in order to offset such a disturbance, but a compensation method may vary according to the cause of the disturbance.

Accordingly, it is necessary to pay compensation for properly removing the disturbance of the steering control apparatus in which various causes compositely operate. Disturbance offsetting techniques, which have been proposed up to now, have handled an individual cause, but technologies for offsetting the disturbance of the steering control apparatus, which occurs due to composite causes, have not been sufficiently developed.

SUMMARY OF THE INVENTION

In this background, an object of the present invention is to provide a steering control apparatus and a steering control method of a vehicle in which a disturbance cause, which generates a disturbance of the steering control apparatus, is confirmed among a plurality of disturbance causes in the steering control apparatus of a vehicle, and then a disturbance offsetting compensation is performed for the disturbance cause.

Another object of the present invention is to provide a technique that is capable of efficiently offsetting a disturbance of a steering control apparatus by confirming a disturbance cause according to frequencies estimated based on three factors that affect the steering control apparatus, and then applying a compensation method which varies depending on whether the disturbance is an internally caused disturbance or an externally caused disturbance.

Another object of the present invention is to provide a technique that is capable of efficiently removing a disturbance of a steering control apparatus, which is generated due to various causes, and determining one of an internally caused disturbance and an externally caused disturbance by: comparing a first estimated frequency estimated based on the estimation of a rack force, a second estimated frequency estimated based on a steering torque signal, and a third estimated frequency estimated based on a vehicle wheel rotational speed; then determining a compensation rate, which varies depending on whether the disturbance is an internally caused disturbance or an externally caused disturbance; and then applying the compensation rate to a steering current value.

In order to achieve the above-described objects, one embodiment of the present invention provides a steering control apparatus. The steering control apparatus includes: an estimated frequency calculation unit including: a first estimated frequency calculation unit configured to calculate a first estimated frequency from an estimated rack force; a second estimated frequency calculation unit configured to calculate a second estimated frequency caused by a front vehicle wheel rotational frequency; and a third estimated frequency calculation unit configured to calculate a third estimated frequency based on a steering torque signal; a main compensation current generating unit configured to generate a main compensation current value based on a change rate of the steering torque signal; a disturbance cause determination unit configured to determine one of an internally caused disturbance and an externally caused disturbance by comparing the first to third estimated frequencies; a disturbance compensation rate calculation unit configured to calculate a disturbance compensation rate which varies depending on whether the disturbance determined by the disturbance cause determination unit is the internally caused disturbance or the externally caused disturbance; and a final disturbance compensation unit configured to generate a final disturbance compensation current by reflecting the disturbance compensation rate to the main compensation current.

Another embodiment of the present invention provides a steering control apparatus that compensates for a disturbance occurring in a steering apparatus. The steering control apparatus identifies a disturbance cause by comparing a first estimated frequency calculated by an estimation of a rack force, a second estimated frequency by a front vehicle wheel rotational frequency, and a third estimated frequency generated based on the steering torque signal, and performs a disturbance compensation, which varies depending on whether the identified disturbance is an internally caused disturbance or an externally caused disturbance.

Still another embodiment of the present invention provides a steering control apparatus. The steering control apparatus includes: a torque sensor configured to measure a steering torque to be input to a steering wheel; a steering control unit configured to generate an auxiliary steering current value based on the steering torque; a steering motor configured to operate according to the auxiliary steering current value of the steering control unit; and a disturbance compensation apparatus configured to: identify a cause of a disturbance by comparing a first estimated frequency calculated by an estimation of a rack force, a second estimated frequency by a front vehicle wheel rotational frequency, and a third estimated frequency generated based on the steering torque signal; perform a disturbance compensation, which varies depending on whether the disturbance is an internally caused disturbance or an externally caused disturbance, so as to calculate a final disturbance compensation current value; and then reflect the final compensation current value to the auxiliary steering current value of the steering control unit.

Yet another embodiment of the present invention provides a steering control method. The steering control method includes: a main compensation current generating step of generating a main compensation current value based on a change rate of a steering torque signal applied to a steering wheel; an estimated frequency calculation step of calculating a first estimated frequency is calculated based on a rack force estimation, calculating a second estimated frequency based on a front vehicle wheel rotational frequency, and calculating a third estimated frequency is calculated based on the steering torque signal; a disturbance cause determination step of identifying a cause of the disturbance by comparing the first to third estimation frequencies; a disturbance compensation rate calculation step of calculating a compensation rate, which varies depending on whether the disturbance is an internally caused disturbance or an externally caused disturbance; and a final disturbance compensation current generating step of generating a final disturbance compensation current by reflecting the disturbance compensation rate to the main compensation current.

According to the present invention to be described below, it is possible to confirm a disturbance cause, which generates a disturbance of the steering control apparatus, among a plurality of disturbance causes in the steering control apparatus of a vehicle, and then to properly perform a disturbance offsetting compensation for the disturbance cause.

More specifically, it is possible to efficiently remove a disturbance of a steering control apparatus which is generated due to various causes by: confirming a cause of a disturbance is confirmed based on estimated frequencies estimated based on three factors that affect the steering control apparatus (i.e., a first estimated frequency estimated based on the estimation of a rack force, a second estimated frequency estimated based on a steering torque signal, and a third estimated frequency estimated based on a vehicle wheel rotational speed); then determining a compensation rate, which varies depending on whether the disturbance is an internally caused disturbance or an externally caused disturbance; and then applying the compensation rate to a steering current value.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
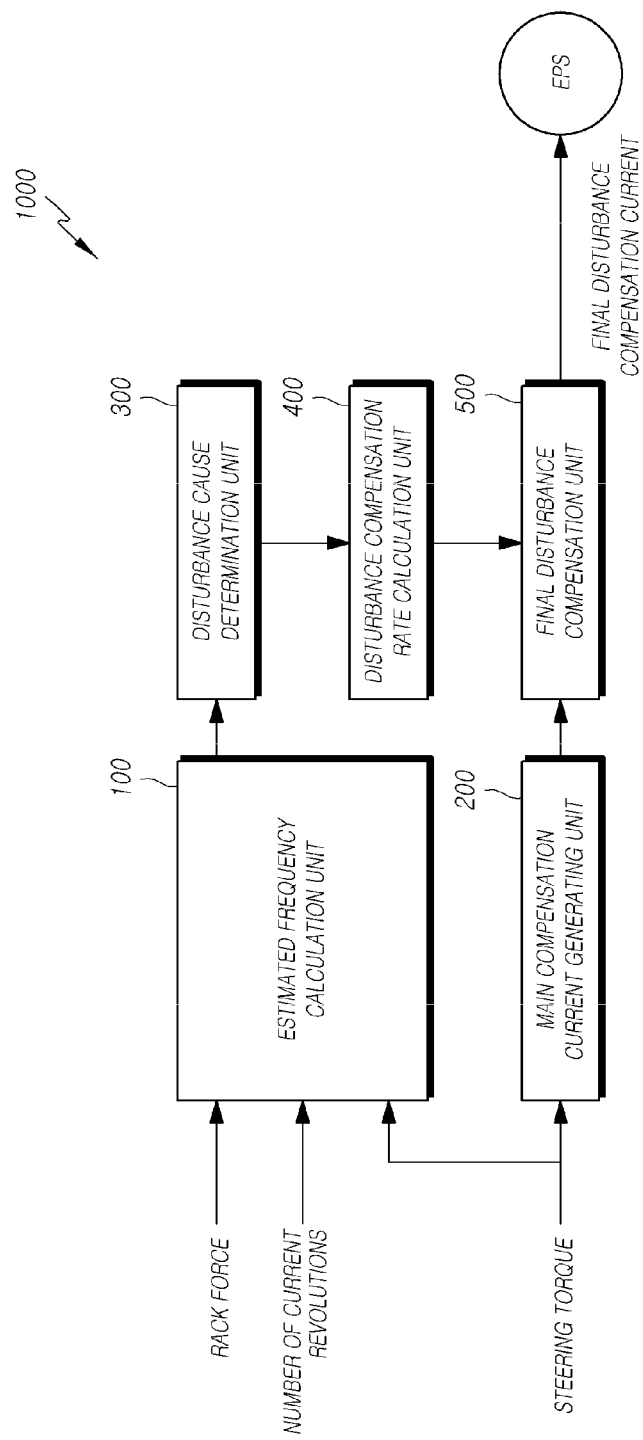
FIG. 1 is a view illustrating an entire configuration of a disturbance compensation device included in a steering control apparatus according to one embodiment of the present invention.

Hereinafter, exemplary embodiments of the present invention will be described with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present invention rather unclear.

In addition, terms, such as first, second, A, B, (a), (b) or the like may be used herein when describing components of the present invention. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a view illustrating an entire configuration of a disturbance compensation device included in a steering control apparatus according to one embodiment of the present invention.

According to an embodiment of the present invention, a disturbance compensation apparatus 1000 is an apparatus that may be included in an electric steering apparatus or may be provided separately from the steering apparatus to generate a disturbance compensation current according to a internal or external disturbance that affects the steering apparatus, and to reflect the disturbance compensation current to an auxiliary steering force of the steering apparatus.

The disturbance compensation apparatus 1000 may generally include: an estimated frequency calculation unit 100 configured to calculate first to third estimated frequencies based on a rack force that is a load applied to a rack bar of a vehicle, a rotational speed of a vehicle wheel, and a steering torque value of a steering torque sensor; a main compensation current generating unit 200 configured to generate a main compensation current for offsetting a disturbance based on the steering torque value; a disturbance cause determination unit 300 configured to determine whether a disturbance is an internally caused disturbance or an externally caused disturbance by comparing the first to third estimated frequencies; a disturbance compensation rate calculation unit 400 configured to determine a disturbance compensation rate according to a disturbance cause; a final disturbance compensation unit 500 configured to calculate a value of a final disturbance compensation current value based on the value of the main compensation current and the disturbance compensation rate and to output the value of the calculated final disturbance compensation current to the electric steering apparatus.

Hereinbelow, the configuration of each of the units that constitute the disturbance compensation apparatus 1000 will be described in detail.

First, the estimated frequency calculation unit 100 functions to classify the frequencies of vibration or a disturbance generated in a vehicle due to various causes into three parameters, and to measure or calculate the parameters.

More specifically, the estimated frequency calculation unit 100 calculates the first estimated frequency as a first disturbance frequency from an estimated rack force estimated from an inverse input or load applied to the rack bar of the vehicle.

In addition, the estimated frequency calculation unit 100 calculates the second estimated frequency as a second disturbance frequency from a front wheel rotational speed or front wheel rotational frequency measured from a vehicle wheel (particularly, front wheel) rotation sensor or the like.

In addition, the estimated frequency calculation unit 100 calculates the third estimated frequency as a third disturbance frequency based on a steering torque signal measured from a steering torque sensor that is linked to a steering wheel.

The first to third estimated frequencies measured as described above are disturbance frequencies measured by different mechanisms, respectively, and may have the same value or different values, which may be used for determine a cause of a disturbance through a comparison thereof.

The main compensation current generating unit 200 calculates a main compensation current value, which is a basic compensation current value to offset a disturbance based on a change rate of the steering torque value. As will be described below, the main compensation current generating unit 200 calculates, after a steering torque value (u) is caused to pass through a High Pass Filter (HPF), a change rate of the steering torque value per time (du/dt), and calculates a main compensation current value by multiplying a predetermined change amount gain value by the main compensation current value.

The main compensation current value calculated as described above is a basic compensation current value to be added to an auxiliary steering current value of the electric steering apparatus in order to offset a disturbance. However, the main compensation current value is applied after a disturbance compensation rate, which is determined according to a cause of the disturbance, is reflected, rather than being directly delivered to the electric steering apparatus.

A disturbance cause determination unit 300 confirms a cause of a disturbance by comparing the first to third estimated frequencies. As will be described below, when the first estimated frequency and the second estimated frequency are substantially equal to each other or all the first to third estimated frequencies are equal to each other, it is determined that the disturbance is an internally caused disturbance, and when the first estimated frequency is substantially equal to the third estimated frequency, but is different from the second estimated frequency, it is determined that the disturbance is an externally caused disturbance.

The disturbance compensation rate calculation unit 400 functions to calculate different disturbance compensation rates depending on whether the disturbance determined by the disturbance cause determination unit is the internally caused disturbance or the externally caused disturbance.

At this time, the disturbance compensation rate calculation unit 400 determines a disturbance compensation rate using a disturbance compensation tuning map (a graph or a table) having a disturbance compensation rate value (Y-axis) depending on a disturbance frequency (X-axis), and in both the internally caused disturbance and the externally caused disturbance, the disturbance compensation rate is basically inversely proportional to the disturbance frequency.

However, when the disturbance is the internally caused disturbance, the disturbance compensation rate always has a positive (+) value. In such a case, a control is performed in such a manner that the auxiliary steering current value of the electric steering apparatus is reduced by the final disturbance compensation current value (i.e., a lower auxiliary steering value is provided in order to offset the disturbance).

On the contrary, when the disturbance is the externally caused disturbance, the disturbance compensation rate of the externally caused disturbance has a relationship that is similar to that of the disturbance compensation rate of the internally caused disturbance, but may have a negative (−) value only in a predetermined first disturbance frequency region.

At this time, because the disturbance compensation rate has a negative (−) value, a control is performed in such a manner that the final disturbance compensation current value is added to the auxiliary steering current value of the electric steering apparatus (i.e., a higher auxiliary steering value is supplied that is increased by the disturbance compensation current value for the externally caused disturbance).

That is, the first disturbance frequency region in which the disturbance compensation rate has a negative (−) value has a range of above 20 Hz to 30 Hz, and when the disturbance frequency is in the first disturbance frequency region (about 20 Hz to 30 Hz), the control is performed in such a manner that the disturbance delivered from the outside of the vehicle, such as a road surface, is added to the auxiliary steering current so as to deliver the disturbance to the driver.

In this way, in a specific disturbance frequency region, delivering the influence of the external disturbance to the driver rather than offsetting the external disturbance may further improve the driver's feeling of discomfort or the like.

The final disturbance compensation unit 500 performs a function of generating a final disturbance compensation current value by multiplying the main compensation current value by the calculate disturbance compensation rate, and delivering the final disturbance compensation current to the electric steering apparatus.

More specifically, as will be described later, the final disturbance compensation unit 500 causes the main compensation current value to pass through a variable Band Pass Filter (BPF), and multiplies the main compensation current value filtered by the BPF by the disturbance compensation rate, thereby calculating the final disturbance compensation current value.

At this time, the variable BPF is a filter that is designed such that the third estimated frequency calculated from the steering torque value is set as a center frequency (f0) and a pre-set margin frequency (Δf) is provided to either side of the central frequency (f0).

The variable BPF is provided in order to enhance the precision of the main compensation current value that serves as a basis when calculating the final disturbance compensation current value. The margin frequency (Δf) may be properly set as a tuning parameter according to a required disturbance compensation degree or resolution.

Figure 2:
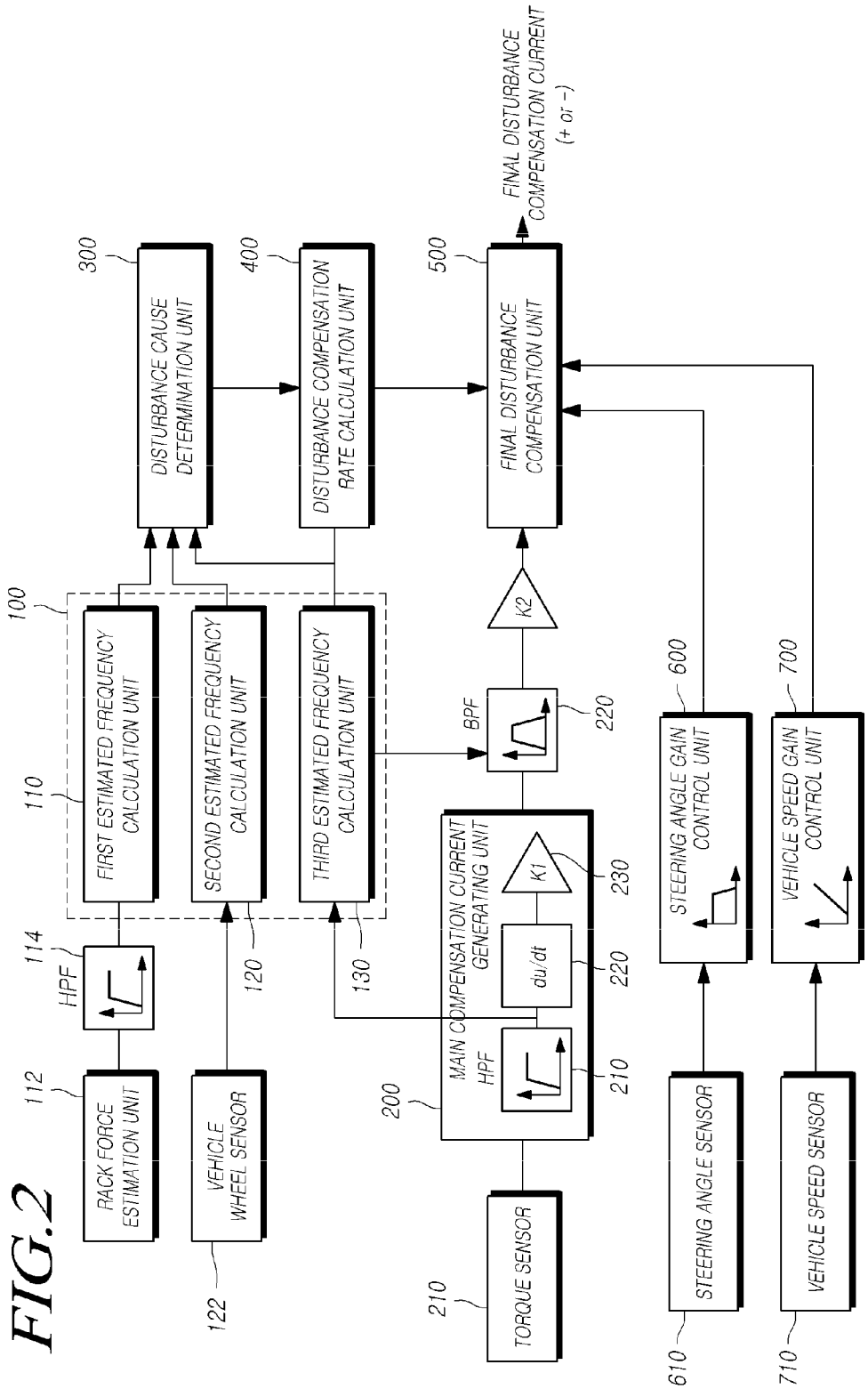
FIG. 2 is a block diagram illustrating detailed functions of a disturbance compensation apparatus according to an embodiment of the present invention.

FIG. 2 is a block diagram illustrating detailed functions of a disturbance compensation apparatus 1000 according to an embodiment of the present invention.

As illustrated in FIG. 2, the estimated frequency calculation unit 100 may include: a first estimated frequency calculation unit 110 configured to compensate a first estimated frequency from the rack force estimation unit 112 configured to estimate the rack bar load; a second estimated frequency calculation unit 120 configured to calculate a second estimated frequency generated by the front wheel rotational speed or front wheel rotational frequency measured by the vehicle wheel sensor 122; and a third estimated frequency calculation unit 130 configured to calculate a third estimated frequency based on a steering torque signal measured by the steering torque sensor 210.

The rack force estimation unit 112 estimates a load input to the rack bar from a mechanical model that constitutes the electric steering system or a rack force which is an inverse input.

Figure 3A:
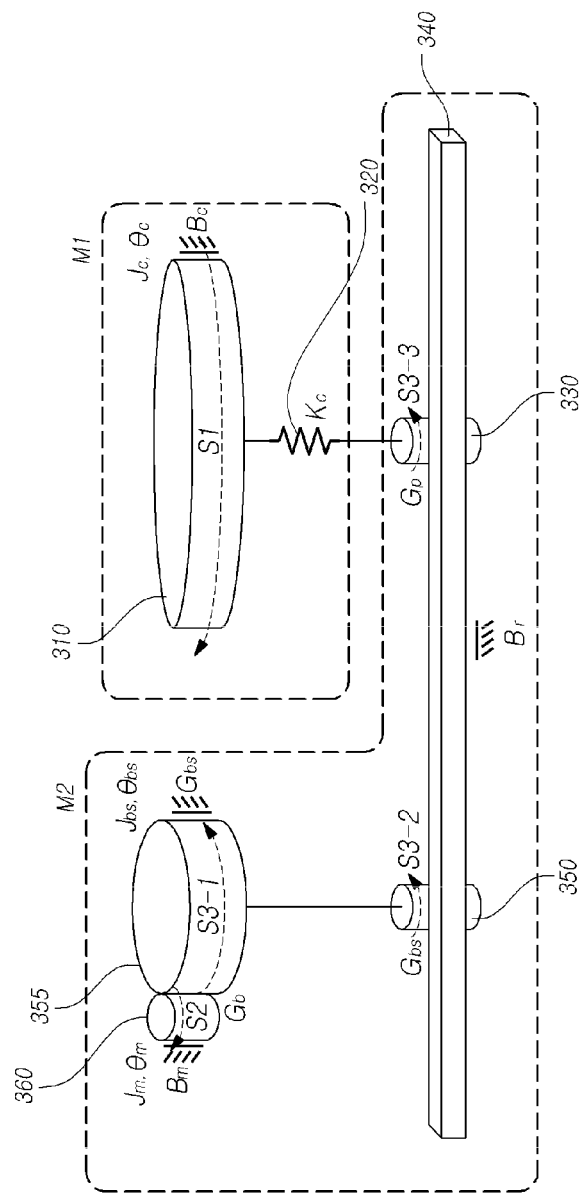
FIGS. 3A and 3B are views each illustrating an example of a rack force estimation method of a rack force estimation unit.
Figure 3B:
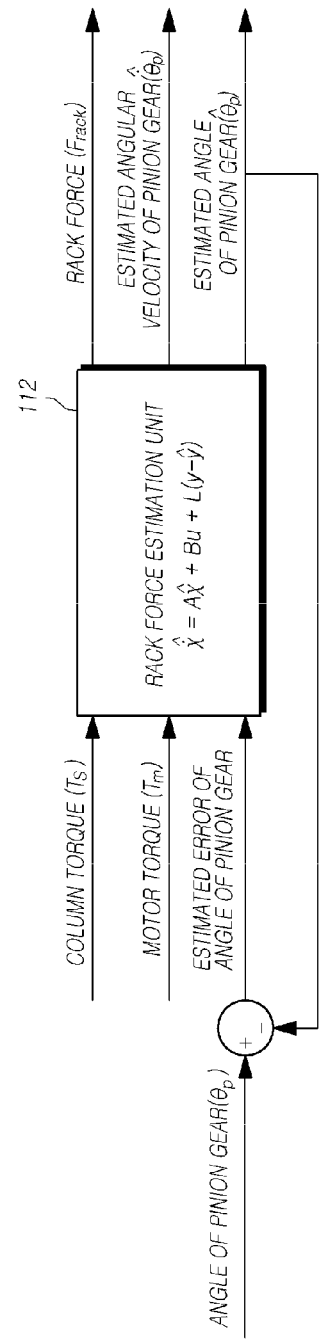

FIGS. 3A and 3B are views each illustrating an example of a rack force estimation method of a rack force estimation unit 112.

More specifically, FIG. 3A illustrates an example of a vehicle modeling analysis for determining a rack force to be used for calculating the second estimated frequency according to an embodiment, and FIG. 3B is a view illustrating an example for describing the operation of the rack force estimation unit.

As illustrated in FIGS. 3A and 3B, by using a state equation that is obtained on the basis of a first modeling analysis and a second modeling analysis in which, with reference the pinion gear 330 of a vehicle steering system, the first modeling analysis performed for a steering manipulation device 310 side M1 where the pinion gear 330 is not included and the second modeling analysis performed for a motor 360 side M2 that includes the pinion gear 330, the rack force estimation unit 112, which is available for an embodiment of the present invention, may estimate one or more of a second rack force, an estimated angle of the pinion gear 330, and an angular velocity of the pinion gear 330.

When the modeling analysis is performed for the steering manipulation device 310 side M1 where the pinion gear 330 is not included, a rotational angle $\theta_c$, inertia $J_c$, and damping $B_c$ may exist in the steering manipulation device 310 according to the movement S1 of the drive torque $T_d$, and a constant $K_c$ by a torsion bar and an shock absorber 320 may exist between the steering manipulation device 310 and the pinion gear 330.

The above-mentioned rotational angle $\theta_c$, the inertial $J_c$, the damping $B_c$, and the constant $K_c$ may be expressed as in the following Equation 1.

$$J_c * \theta_c'' = -K_c * (\theta_c - \theta_p) - B_c * \theta_c' + T_d \quad \text{Equation 1}$$

Here, $\theta_p$ means an angle of the pinion gear 330, $\theta_c'$ means a rotational angular velocity that is obtained through a first-order differential of $\theta_c$ by time, and $\theta_c''$ means a rotational angular acceleration that is obtained through a second-order differential of $\theta_c$ by time.

When the modeling analysis is performed for the motor 360 side M2 where the pinion gear 330 is included, a rotational angle $\theta_m$, inertia $J_m$, and damping $B_m$ may exist in the motor 360 according to a movement S2 of a motor torque $T_m$ by the motor 360, and a rotational angle $\theta_{bs}$, inertia $J_{bs}$, and damping $B_{bs}$ may also exist in ball screw gears 350 and 355 that respectively have movements S3-1 and S3-2 by a belt that interconnects the motor 360 and the ball screw gears 350 and 355. The motor 360 and the ball screw gear 355 interconnected by the belt may have a gear ratio $G_b$, the ball screw gear 350 and the rack bar 340, which are rotationally engaged with each other, may have a gear ratio $G_{bs}$, and the rack bar 340 and the pinion gear 330, which are rotationally engaged with each other, may have a gear ratio $G_p$. Further, damping $B_r$ may exist in the rack bar 340.

A second relational expression of the above-mentioned variables may be expressed as in the following Equation 2.

$$(J_m + J_{bs}) * \theta_p'' = K_c * (\theta_c - \theta_p) - (B_m + B_{bs}) * \theta_p' - G_p * F_r + (G_b * G_p / G_{bs}) * T_m \quad \text{Equation 2}$$

Here, $\theta_p'$ means a rotational angular velocity that is obtained through a first-order differential of $\theta_p$ by time, and $\theta_p''$ means a rotational angular acceleration of the pinion gear, which is obtained through a second-order differential of $\theta_p$ by time.

Inertia $J_{peq}$ and damping $B_{peq}$ in one object that is equivalent to the motor 360 side M2, which includes the pinion gear 330 and is configured with the motor 360, the ball screw gears 350 and 355, and the pinion gear 330 may be expressed as in the following Equation 3.

$$J_{peq} = J_m + J_{bs}, B_{peq} = B_m + B_{bs} \quad \text{Equation 3}$$

When Equation 3 is put in Equation 2, the following Equation 4 can be obtained.

$$J_{peq} * \theta_p'' = K_c * (\theta_c - \theta_p) - B_{peq} * \theta_p' - G_p * F_r + (G_b * G_p / G_{bs}) * T_m \quad \text{Equation 4}$$

Based on Equation 1 obtained through the modeling analysis of the steering manipulation device 310 side M1 that does not include the pinion gear 330 and Equation 4 obtained through the modeling analysis of the motor 360 side M2 that includes the pinion gear 330, Equation 5 can be obtained, which is a state equation that includes the rack force, the rotational angular velocity of the pinion gear, the rotational angular acceleration of the pinion gear, and a first-order differential of the rack force, as output variables. Equation 5 may include the rack force $F_{rack}$ in the output after converting the rack force $F_{rack}$ into a state variable.

$$\begin{bmatrix} \theta_p' \\ \theta_p'' \\ F_{rack}' \end{bmatrix} = \begin{bmatrix} 0 & 1 & 0 \\ 0 & -(B_{peq}/J_{peq}) & -(G_p/J_{peq}) \\ 0 & 0 & 0 \end{bmatrix} \begin{bmatrix} \theta_p \\ \theta_p' \\ F_{rack} \end{bmatrix} + \begin{bmatrix} 0 & 0 \\ 1/(J_{peq}) & (G_b G_p)/(J_{peq} G_{bs}) \\ 0 & 0 \end{bmatrix} \begin{bmatrix} T_s \\ T_m \end{bmatrix} \quad \text{Equation 5}$$

Here, $T_s$ means a column torque sensed by the torsion bar.

In addition, when a feedback structure in which the estimated angle of the pinion gear is compensated for the angle of the pinion gear is applied, an estimator can be obtained into which a column torque, a motor torque, and an angle of the pinion gear are input in order to output a rack force, an estimated angle of the pinion gear, and an estimated angular velocity of the pinion gear.

$$\hat{x}' = A\hat{x} + Bu + L(y - \hat{y}) \qquad \text{Equation 6}$$

Here, $$A = \begin{bmatrix} 0 & 1 & 0 \\ 0 & -(B_{peq}/J_{peq}) & -(G_p/J_{peq}) \\ 0 & 0 & 0 \end{bmatrix},$$

$$B = \begin{bmatrix} 0 & 0 \\ 1/(J_{peq}) & (G_b G_p)/(J_{peq} G_{bs}) \\ 0 & 0 \end{bmatrix}, \quad u = \begin{bmatrix} T_s \\ T_m \end{bmatrix}$$

$$x = \begin{bmatrix} \theta'_p \\ \theta''_p \\ F'_{rack} \end{bmatrix}, \quad y = \begin{bmatrix} 1 & 0 & 0 \end{bmatrix} \begin{bmatrix} \theta_p \\ \theta'_p \\ F_{rack} \end{bmatrix}.$$

In addition, L is a value designed to make an error converge, $\hat{x}$ means estimated x, $\hat{x}'$ means estimated x' and $\hat{y}$ means estimated y.

Meanwhile, referring to FIG. 3B, by applying a motor torque calculated based on a motor current, an estimated angular error of the pinion gear calculated by subtracting the estimated angle of the pinion gear from the estimated angle of the pinion gear, and a column torque to the rack force estimation unit 112, to which calculated Equation 6 is applied, the rack force estimation unit 112 may estimate one or more of the final rack force $F_{rack}$, the estimated angle of the pinion gear, and the estimated angular velocity of the pinion gear.

In this way, the first estimated frequency indicating a change in rack force can be determined by analyzing the value of the final rack force $F_{rack}$, which is estimated by the rack force estimation unit 112, at each time zone.

Meanwhile, in order to remove a low frequency band signal, which is noise, from the rack force $F_{rack}$ value, which is calculated by the rack force estimation unit 112, the disturbance compensation apparatus may further include a Hi-Pass Filter (HPF) 114.

That is, after the rack force $F_{rack}$ value, which has been calculated by the rack force estimation unit 112, may be caused to pass through the HPF 114, then only the high frequency component of the rack force may be extracted, and the first estimated frequency may be calculated therefrom.

However, the configuration of the above-described rack force estimation unit 112 is merely an example. Another rack force estimation technology may be used as long as an inverse input applied to the rack bar from the outside or a rack force, which is a load, can be measured, and the first estimated frequency can be calculated from the change according to time in the rack force value.

Meanwhile, the second estimated frequency calculation unit 120 may measure the rotational speed of the front vehicle wheels from a vehicle wheel sensor, and the number of revolutions per unit time (s) of the front vehicle wheels may be determined as a second estimated frequency from the rotational speed of the front vehicle wheels.

In addition, the third estimated frequency calculation unit 130 may obtain a dominant frequency of a steering torque by causing the steering torque value output from the steering torque sensor to pass through the HPF 210 and analyzing a change of the steering torque from the steering torque value, and determines the frequency as the third estimated frequency.

At this time, in order to determine the dominant frequency of the steering torque, the following Equation 7 may be used.

$$\ddot{z}(t) + 2\zeta\omega(t)\dot{z}(t) + \omega(t)^2 z(t) = \omega(t)^2 d(t) \qquad \text{Equation 7}$$

$$\dot{\omega}(t) + \gamma z(t)\{\omega(t)^2 d(t) - 2\zeta\omega(t)\dot{z}(t)\} = 0$$

$$[z(t_o) \quad \dot{z}(t_o) \quad \omega(t_o)]^T = \begin{bmatrix} -\dfrac{\hat{k}}{2\zeta} & 0 & \omega_o \end{bmatrix}^T$$

Equation 7 is an equation of an adaptive notch filter that estimates a disturbance frequency w* and a disturbance magnitude k from a disturbance signal, d(t)=k·sin(w*·t), which is an input signal.

In Equation 7, d is a disturbance input signal, z is an internal state variable of the adaptive notch filter, and $\zeta$ is a value for determining a damping ratio (i.e., a notch depth).

In addition, γ is a parameter for determining an adaptive speed, $\zeta$ and γ are parameters that shall be properly selected in consideration of an overshoot (associated with a damping ratio) when an estimated speed and an estimated value converge.

ω is an estimated value of a disturbance frequency w*, k^ is an estimated value of a disturbance magnitude k, to means the initial time, and ω0 means the initial value of the estimated value w of the disturbance frequency w*.

In addition, T indicates a matrix operator that transposes rows and columns.

z(t0), z' (t0), and w(t0) at the initial time (i.e., t0) (i.e., the initial values of z, z', and w) have values of –k^/(2$\zeta$), 0, and w0, respectively, and w0 may be properly selected as the initial value.

Equation 7 is calculated in real time, the disturbance magnitude K is estimated as K^=z·(−2$\zeta$) in real time based on the values of z, z', and w, and the disturbance frequency may be estimated based on w. (when represented by Hz, w/(2π)).

That is, the third estimated frequency calculation unit may calculate the disturbance frequency w* that is a dominant high frequency component of a steering torque value by analyzing the change in a steering torque value that has passed through the HPF 210 according to time by using Equation 7 or the like, and determines the disturbance frequency as the third estimated frequency.

Of course, Equation 7 shall not be necessarily used in order to determine the dominant frequency of the steering torque value, and other algorithms may be used.

Meanwhile, the above-described HPF 210 is used for removing a low frequency component of a steering torque value corresponding to a steering intention of a driver who operates the steering wheel.

That is, when the steering torque value passes through the HPF 210, a steering torque change component related to the driver's steering intention is removed, only a component generated by an internal disturbance of the vehicle, such as vibration of an engine or another portion of the vehicle, remains, and a high frequency component by the internal disturbance by the vehicle is determined as the third estimated frequency.

The disturbance cause determination unit 300 performs a function of comparing the first to third estimated frequencies that are estimated as described above so as to determine whether the disturbance, which generates the current disturbance frequency, is an internally caused disturbance or an externally caused disturbance.

More specifically, in a first case in which the first estimated frequency and the second estimated frequency are substantially equal to each other or in a second case in which all the first to third estimated frequencies are equal to each other, it is determined that the disturbance is an internally caused disturbance, and in a third case in which the first estimated frequency is substantially equal to the third estimated frequency, but is different from the second estimated frequency, it is determined that the disturbance is an externally caused disturbance.

It may be estimated that the first case where the first estimated frequency and the second estimated frequency are substantially equal to each other as described above is caused due to an imbalance occurring between the left and right vehicle wheels or tires. The vibration delivered to the steering wheel (handle) when a lateral force is generated by the imbalance between the vehicle wheels or tires may be expressed as "Smooth Road Shake (SRS)" or "shimmy" (hereinafter, referred to as "SRS").

Meanwhile, in the second case in which all the first to third estimated frequencies are substantially equal to each other, it may be estimated that there is a disturbance caused by another internal cause of the vehicle other than the imbalance between the vehicle wheels or tires (e.g., the vibration of the engine or the like).

As described above, both the first and second cases are caused by a disturbance caused inside the vehicle, such as the imbalance between the vehicle wheels or the vibration of the engine. In this case, as will be described below, the disturbance compensation rate is always determined as a positive (+) value so that a predetermined final disturbance compensation current value is subtracted from the auxiliary steering current value of the steering system, thereby offsetting the disturbance.

On the contrary, in the third case where the first estimated frequency is substantially equal to the third estimated frequency, but is different from the second estimated frequency, it may be estimated that the cause of the disturbance is a cause occurring outside the vehicle, such as an input from a road surface.

As described above, the third case is a disturbance occurring by a cause generated outside the vehicle. In this case, as will be described below, the disturbance compensation rate is determined as a negative (−) value in a predetermined first disturbance frequency region to perform a control such that a predetermined final disturbance compensation current value is added to the auxiliary steering current of the steering system, thereby causing the auxiliary steering force component by the disturbance is further delivered to the steering wheel.

Meanwhile, the main compensation current generating unit 200 functions to generate a main compensation current value based on the change rate of a steering torque signal. In more detail, the main compensation current generating unit 200 may include: an HPF 210 configured to remove a low frequency component of a steering torque value that corresponds to the steering intention of the driver who operates the steering wheel from steering torque change components; a differentiator 220 configured to calculate a change rate of the steering torque by differentiating the output value of the HPF; and a change amount gain unit 230 configured to multiply a predetermined change amount gain K1 in the steering torque.

That is, the main compensation current generating unit 200 generates a main compensation current value which is a basic compensation current for compensating for the disturbance by removing the driver's steering intention component from the steering torque value (u) output from the steering torque sensor, then calculating a change rate per time (du/dt), and then multiplying the predetermined change amount gain K1 depending on the magnitude of the change rate.

Figure 4:
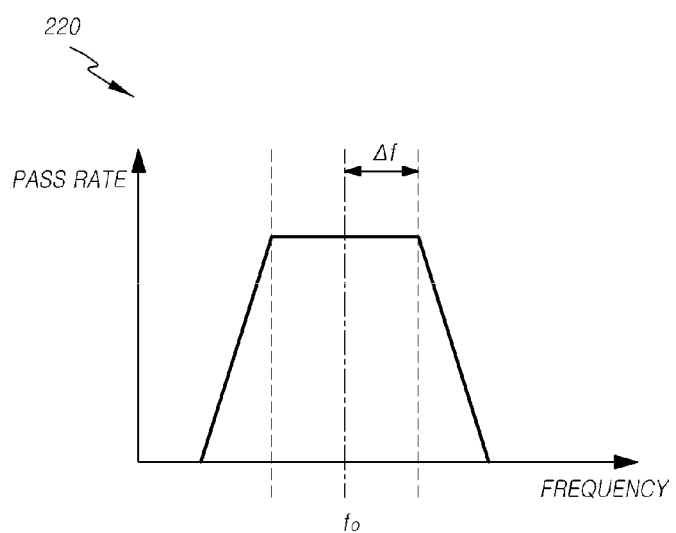
FIG. 4 is a view illustrating a filter characteristic of a variable band pass filter to be used for an embodiment of the present invention.

FIG. 4 is a view illustrating a filter characteristic of a variable band pass filter 220 to be used for an embodiment of the present invention.

The main compensation current value output from the main compensation current generating unit 200 is filtered through the variable band pass filter 220 in which the third estimated frequency calculated from the steering torque is set as a central frequency, rather than being directly input to the final disturbance compensation unit.

As in FIG. 4, the variable band pass filter 220 is a filter that is designed such that the third estimated frequency calculated from the steering torque value is set as a center frequency (f0) and a pre-set margin frequency (Δf) is provided to either side of the central frequency (f0).

The margin frequency (Δf) of the variable band pass filter 220 may be properly set as a tuning parameter according to a required disturbance compensation degree or resolution.

That is, by passing only a value around the third estimated frequency, which is a disturbance frequency calculated from the steering torque value among change rate values of the steering torque per time, which forms the main compensation current value, only the main compensation current value by a disturbance component generated by an internal cause of the vehicle is selected, excluding the non-uniformity of vehicle wheels and any other external cause.

In this way, it is possible to improve the precision of the main compensation current value.

Figure 5A:
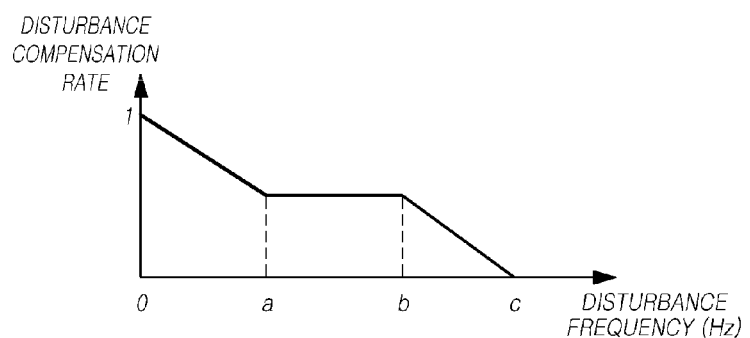
FIGS. 5A and 5B are views each illustrating a disturbance compensation rate calculation method according to a disturbance frequency according to the present invention, in which FIG. 5A corresponds to a case for an internally caused disturbance and FIG. 5B corresponds to a case for an externally caused disturbance.
Figure 5B:
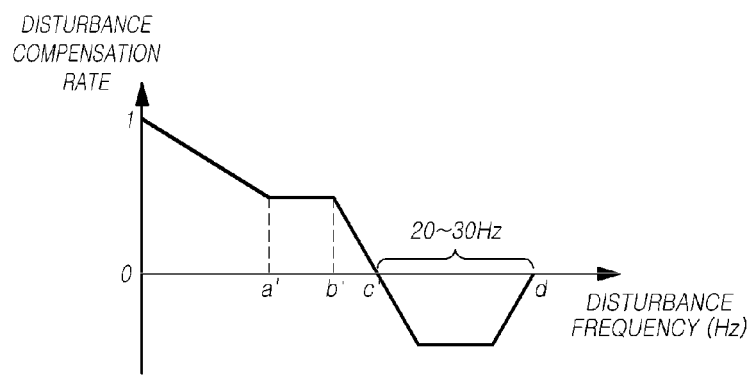

FIGS. 5A and 5B are views each illustrating a disturbance compensation rate calculation method according to a disturbance frequency according to the present invention, in which FIG. 5A corresponds to a case for an internally caused disturbance and FIG. 5B corresponds to a case for an externally caused disturbance.

In FIGS. 5A and 5B, the X-axis represents a disturbance frequency that corresponds to a final disturbance frequency determined by the disturbance cause determination unit. That is, in the above-described first case, the first estimated frequency or the second estimated frequency becomes the disturbance frequency, in the second case, one of the first to third estimated frequencies becomes the disturbance frequency, and in the third case, the second estimated frequency becomes the disturbance frequency.

In FIGS. 5A and 5B, the Y-axis represents a disturbance compensation rate value, of which the maximum value may not exceed 1.

As in FIG. 5A, when the disturbance is an internally caused disturbance, the disturbance compensation rate has a characteristic of decreasing according to the increase of the disturbance frequency, and always has a positive (+) value.

More specifically, when the disturbance frequency is low, the disturbance compensation rate becomes a value that is close to 1, and decreases as the disturbance frequency increases.

In particular, the disturbance compensation rate may have the following characteristics: when the disturbance frequency is in the region of 0 to a, the disturbance compensation rate linearly decreases; when the disturbance frequency is in the region of a to b, the disturbance compensation rate is maintained constantly; and when the disturbance frequency is in the region of b to c, the disturbance compensation rate linearly decreases again.

In particular, when the disturbance frequency is equal to or higher than c, the disturbance compensation rate becomes 0 so that the disturbance compensation may not be performed at all.

At this time, the values of the disturbance frequencies a, b, and c are tuning parameters and may be variably set depending on a type of a disturbance, a disturbance offsetting degree, and the like.

Meanwhile, as in FIG. 5B, when the disturbance is an externally caused disturbance, the disturbance has a characteristic in which the disturbance compensation rate decreases according to the increase of the disturbance frequency, and in a low frequency band, the disturbance compensation rate has a positive (+) value while having a characteristic that is similar to that of an internally caused disturbance as illustrated in FIG. 5A. However, in a predetermined first disturbance frequency region of c' to d, the externally caused disturbance may have a negative value.

More specifically, the disturbance compensation rate may have the following characteristics: when the disturbance frequency is in the region of 0 to a', the disturbance compensation rate linearly decreases, when the disturbance frequency is in the region of a' to b', the disturbance compensation rate is maintained constantly, and when the disturbance frequency is in the region of b' to c', the disturbance compensation rate linearly decreases again.

Particularly, when the disturbance is an externally caused disturbance, the disturbance compensation rate has a negative value when the disturbance frequency is in the region of c' to d (first disturbance frequency region), the disturbance frequency rate has a negative value so that a control is performed to add a compensation current value by the disturbance to the basic auxiliary steering current of the steering system.

At this time, the disturbance frequency range of c' to d in which the disturbance compensation rate has a negative (−) value becomes the first disturbance frequency region, and the first disturbance frequency region may be about 20 Hz to 30 Hz.

In this case, when the disturbance is a disturbance generated by an external cause of the vehicle and the disturbance frequency corresponds to the first disturbance frequency region, the disturbance compensation rate is determined as a negative (−) value to perform a control such that a predetermined final disturbance compensation current value is added to the auxiliary steering current of the steering system, thereby causing the auxiliary steering force component by the disturbance is further delivered to the steering wheel.

As will be described with reference to FIG. 6, in the present specification, it will be described as a method of subtracting a final disturbance compensation current value generated by the disturbance compensation apparatus from an auxiliary steering current value output from an electric steering apparatus (subtracter 2300 in FIG. 6).

Accordingly, when the final disturbance compensation current value becomes a positive (+) value, the final auxiliary steering current value is applied as a value that is smaller than the auxiliary steering current value by the final disturbance compensation current value, and as a result, a control is performed to subtract a portion caused by the disturbance from the basic steering assistance.

Accordingly, when the final disturbance compensation current value becomes a negative (−) value, the final disturbance compensation current value is applied as a value that is larger than the basic auxiliary steering current value by the final disturbance compensation current value, and as a result, a control is performed to add a portion caused by the disturbance to the basic steering assistance.

However, the positive or negative value of a disturbance compensation rate may be determined in a manner that is different from the above-described methods.

For example, in the case of defining a final disturbance compensation current value generated by the disturbance compensation apparatus in a manner of adding it (adder) to an auxiliary steering current value output from an electric steering apparatus, an internally caused disturbance may be defined as a disturbance of which the disturbance compensation rate always has a negative (−) value, and an externally caused disturbance may be defined as a disturbance of which the disturbance compensation rate has a positive (+) value in the first disturbance frequency region.

Meanwhile, the disturbance compensation apparatus 1000 according to the present invention may further include: a steering angle gain control unit 600 configured to calculate a steering angle gain that is inversely proportional to the steering angle and to reflect the steering angle gain to the generation of a final disturbance compensation current; and a vehicle speed gain control unit 700 configured to calculate a vehicle speed gain that is proportional to a vehicle speed to reflect the vehicle speed gain and to the generation of the final disturbance current.

More specifically, the steering angle control unit 600 may set a steering angle gain that is close to 1 when the steering angle measured by the steering angle sensor 610 is small, and may reduce the steering angle gain as the steering angle increases to set the steering angle gain to 0 when the steering angle is in a predetermined range or more.

When the driver applies a large steering input to generate a large steering angle is generated, it is not necessary to consider the disturbance offsetting function, and the steering angle gain is defined in such a manner that the disturbance compensation according to the present invention is performed only within a specific steering angle.

The steering angle gain calculated in this manner is transferred to the final disturbance compensation unit, and the final disturbance compensation unit may calculate a final disturbance compensation value by multiplying a disturbance compensation control value calculated by applying the disturbance compensation rate to a main compensation current value by the steering angle gain.

The vehicle speed gain control unit 700 may set a vehicle speed gain to 0 when the vehicle speed measured by a vehicle speed sensor 710 is low, and may increase the vehicle speed gain as the vehicle speed increases to set the vehicle speed gain as 1 when the vehicle speed is in a predetermined range or more.

Because the influence of a disturbance increases as the vehicle speed increases, no disturbance compensation is performed at a low vehicle speed, and as the vehicle speed increases, a larger disturbance compensation is performed.

The vehicle speed gain calculated in this manner is transferred to the final disturbance compensation unit, and the final disturbance compensation unit may calculate a final disturbance compensation value by multiplying a disturbance compensation current value calculated by applying the disturbance compensation rate to a main compensation current value by the vehicle speed gain.

Figure 6:
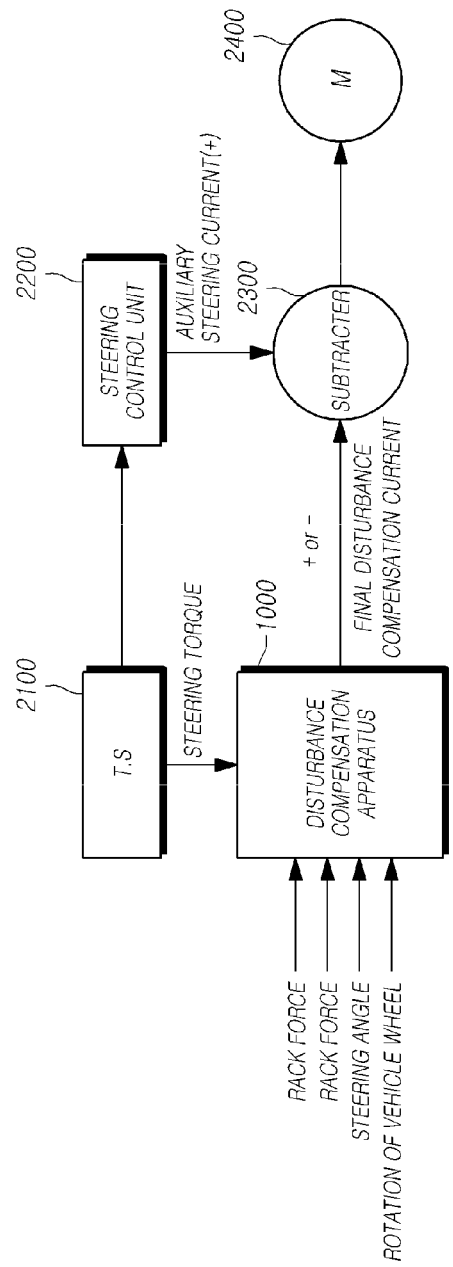
FIG. 6 is a view illustrating a configuration of an entirely electrical steering control apparatus to which a disturbance compensation apparatus according to the present invention is applied.

FIG. 6 is a view illustrating a configuration of an entirely electrical steering apparatus to which a disturbance compensation apparatus according to the present invention is applied.

The steering apparatus according to the present invention includes: a torque sensor 2100 configured to measure a steering torque input to the steering wheel; a steering control unit 2200 configured to generate an auxiliary steering current value based on the steering torque; a steering motor 2400 configured to operate according to the auxiliary steering current value of the steering control unit; and a disturbance compensation apparatus 1000 configured as described above.

As described above, the disturbance compensation apparatus 1000 identifies a cause of a disturbance by comparing a first estimated frequency calculated by an estimation of a rack force, a second estimated frequency by a front vehicle wheel rotational frequency, and a third estimated frequency generated based on the steering torque signal, performs a disturbance compensation which varies depending on whether the disturbance is an internally caused disturbance or an externally caused disturbance to calculate a final disturbance compensation current value, and then reflects the final compensation current value to the auxiliary steering current value of the steering control unit.

The steering control unit 2200 generates an auxiliary steering current value that is proportional to the steering torque value of the torque sensor, and the subtracter 2300 subtracts the final disturbance compensation current value output from the disturbance compensation apparatus 1000 from the auxiliary steering current value to output a current value to be applied to a final motor.

That is, the auxiliary steering current value output by the steering control unit 2200 may always have a positive (+) value, and the final disturbance compensation current value output from the disturbance compensation apparatus may have a positive value or a negative value. When the final disturbance compensation current has a positive value, the final disturbance compensation current value is subtracted from the auxiliary steering current value, and when the final disturbance compensation current has a negative value, the final disturbance compensation current value is added to the auxiliary steering current value to be applied to the steering motor.

Of course, as described above, when the positive or negative of the disturbance compensation rate is oppositely defined, the subtracter 2300 may be replaced by an adder.

Figure 7:
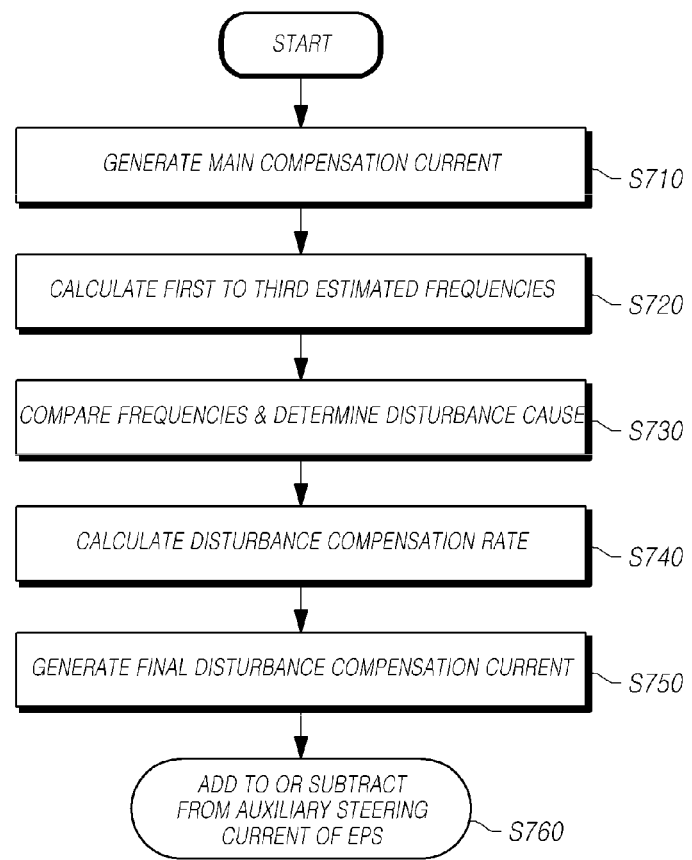
FIG. 7 is a flowchart generally illustrating an entire flow of a steering control method, more specifically a disturbance compensation method according to the present invention.

FIG. 7 is a flowchart generally illustrating an entire flow of a steering control method, more specifically a disturbance compensation method according to the present invention.

A disturbance compensation method according to the present invention includes: a main compensation current generating step (S710) in which a main compensation current value is generated based on a change rate of a steering torque signal applied to a steering wheel; an estimated frequency calculation step (S720) in which a first estimated frequency is calculated based on a rack force estimation, a second estimated frequency is calculated based on a front vehicle wheel rotational frequency, and a third estimated frequency is calculated based on the steering torque signal; a disturbance cause determination step (S730) in which the first to third estimation frequencies are compared to identify a cause of the disturbance; a disturbance compensation rate calculation step (S740) in which a disturbance compensation rate is calculated which varies depending on whether the disturbance is an internally caused disturbance or an externally caused disturbance; and a final disturbance compensation current generating step (S750) in which the disturbance compensation rate is reflected to the main compensation current to generate a final disturbance compensation current.

Figure 8:
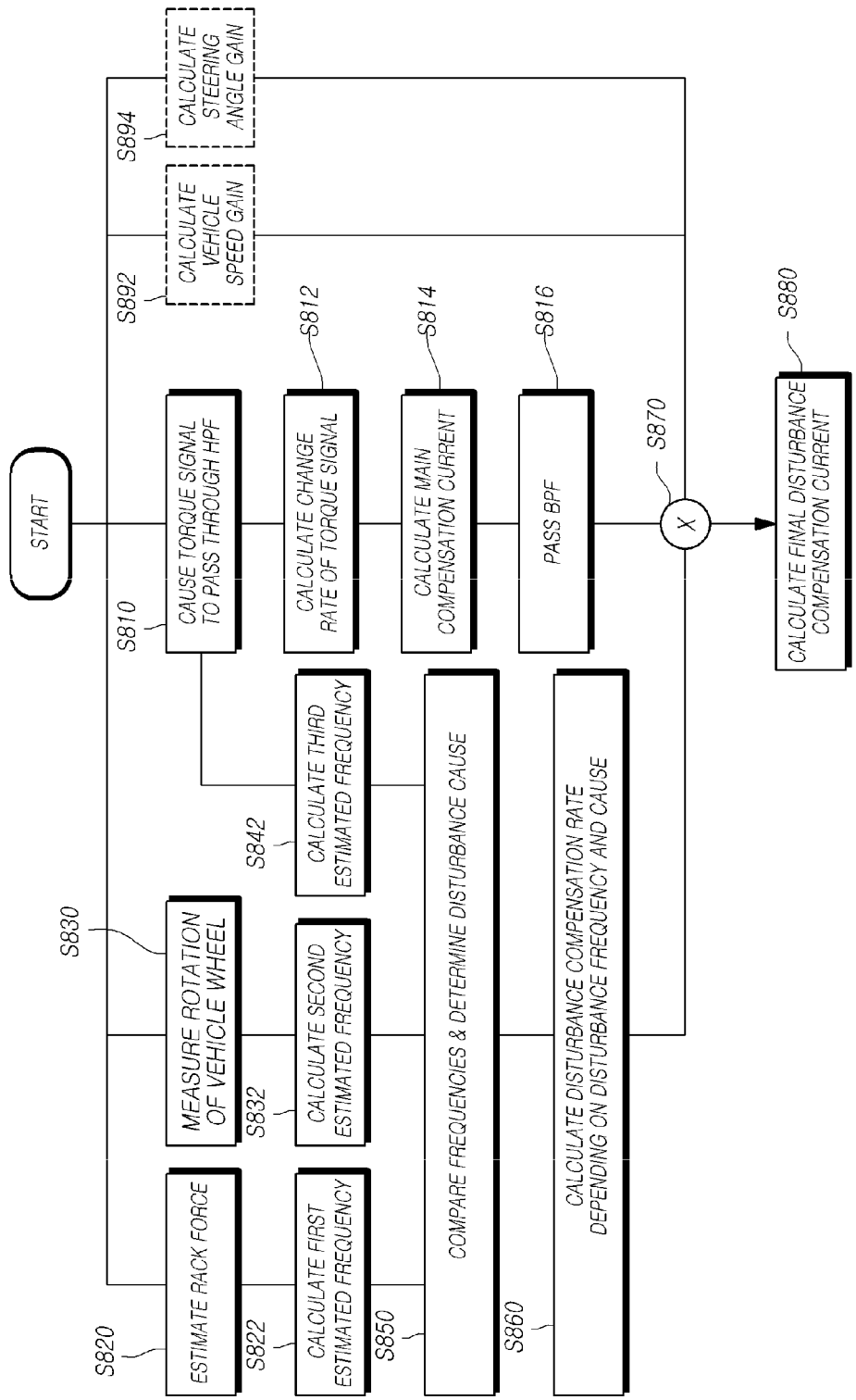
FIG. 8 is a flowchart illustrating a more detailed flow of a disturbance compensation method of the present invention.

FIG. 8 is a flowchart illustrating in more detail a flow of a disturbance compensation method of the present invention.

First, a steering torque signal from the torque sensor is filtered by an HPF to remove a driver's steering intension component, then a change rate of the torque signal is calculated, and the change rate is caused to pass through a BPF of which the central frequency is the third estimated frequency estimated from the steering torque value, to calculate the main compensation current value (S810, S812, S814, and S816).

A rack force, which is a load applied to the rack bar, is estimated using a rack force estimation unit (S820), and after causing the rack force to pass through the HPF, the first estimated frequency is calculated (S822).

The second estimated frequency is calculated (S830 and S832) based on the rotational speed or rotational frequency that is input from the vehicle wheel sensor, and the third estimated frequency is calculated using the steering torque value (S842).

The main compensation current generation process and the first to third estimated frequency estimation processes are not necessarily performed in a time series manner, and may be simultaneously performed.

Next, it is determined determine whether a disturbance is an internally caused disturbance or an externally caused disturbance by comparing the first to third estimated frequencies (S850).

More specifically, in a first case in which the first estimated frequency and the second estimated frequency are substantially equal to each other or in a second case in which all the first to third estimated frequencies are equal to each other, it is determined that the disturbance is an internally caused disturbance, and in a third case in which the first estimated frequency is substantially equal to the third estimated frequency, but is different from the second estimated frequency, it is determined that the disturbance is an externally caused disturbance.

Simultaneously with determining a cause of the disturbance, a disturbance frequency is determined. That is, when the disturbance is an internally caused disturbance, the first estimated frequency may be the disturbance frequency, and when the disturbance is an externally caused disturbance, the second estimated frequency may be the disturbance frequency.

Next, the disturbance compensation rate, which is determined as a function for the disturbance frequency, is calculated (S860). More specifically, in the case of an internally caused disturbance, the disturbance compensation rate is determined to be inversely proportional to the disturbance frequency and to always have a positive value. In the case of an externally caused disturbance, the disturbance compensation rate is determined to be inversely proportional to the disturbance frequency and to have a positive value within a predetermined disturbance frequency range, but to have a negative value in the first disturbance frequency region (about 20 Hz to 30 Hz).

A final disturbance compensation current value is calculated by multiplying the main compensation current value calculated in step S816 by the disturbance compensation rate (S880).

Of course, a vehicle speed gain value, which is proportional to a vehicle speed, and a steering gain value, which is inversely proportional to a steering angle, may be separately calculated, and then may also be applied together with the calculation of the final disturbance compensation current (S892 and S894).

The final disturbance compensation current value is delivered to the electric steering system as in FIG. 6, and is added to or subtracted from the auxiliary steering current value calculated by the steering system according to the steering torque such that the final motor application current to be applied to the steering motor is calculated.

According to the present invention described above, it is possible to efficiently remove a disturbance of a control of a steering apparatus which is generated due to various causes by: confirming a cause of a disturbance is confirmed based on estimated frequencies estimated based on three factors that affect the steering control apparatus (i.e., a first estimated frequency estimated based on the estimation of a rack force, a second estimated frequency estimated based on a steering torque signal, and a third estimated frequency estimated based on a vehicle wheel rotational speed); then determining a compensation rate, which varies depending on whether the disturbance is an internally caused disturbance or an externally caused disturbance; and then applying the compensation rate to a steering current value.

Particularly, when the disturbance is an externally caused disturbance and the disturbance frequency is in a predetermined band (e.g., the first disturbance frequency region of about 20 Hz to 30 Hz), it is possible to keep the steering feeling good despite the disturbance by performing a control in such a manner that the disturbance compensation current is added to the auxiliary steering current.

Even when all the elements constituting an embodiment of the present invention have been described above as being combined into a single unit or combined to be operated as a single unit, the present invention is not necessarily limited to such an embodiment. That is, at least two elements of all structural elements may be selectively joined and operate without departing from the scope of the present invention. Although a preferred embodiment of the present invention has been described for illustrative purposes, those skilled in the art will appreciate that various modifications, additions and substitutions are possible, without departing from the scope and spirit of the invention as disclosed in the accompanying claims. The scope of the present invention shall be construed on the basis of the accompanying claims in such a manner that all of the technical ideas included within the scope equivalent to the claims belong to the present invention.

What is claimed is:

1. A steering control apparatus of a vehicle comprising:
   a torque sensor configured to generate a steering torque signal based on a steering torque of a steering shaft connected to a steering wheel;
   a steering motor configured to move a rack bar of the vehicle based on a final disturbance compensation current; and
   a steering electronic control unit (ECU) configured to
      estimate a rack force based on a load applied to the rack bar of the vehicle,
      calculate a first estimated frequency from the estimated rack force,
      calculate a second estimated frequency caused by a front vehicle wheel rotational frequency,
      calculate a third estimated frequency based on the steering torque signal,
      determine one of an internally caused disturbance and an externally caused disturbance by comparing the first to third estimated frequencies,
      calculate a disturbance compensation rate which varies depending on whether the determined disturbance is the internally caused disturbance or the externally caused disturbance,
      generate a main compensation current value based on a change rate of the steering torque signal, and
      generate the final disturbance compensation current by reflecting the disturbance compensation rate to the main compensation current.

2. The steering control apparatus of claim 1, wherein, when the first estimated frequency and the second estimated frequency are equal to each other or all the first to third estimated frequencies are equal to each other, the steering ECU determines that the disturbance is an internally caused disturbance, and when the first estimated frequency is equal to the third estimated frequency, but is different from the second estimated frequency, the steering ECU determines that the disturbance is an externally caused disturbance.

3. The steering control apparatus of claim 1, wherein the disturbance compensation rate has a value related to a disturbance frequency, wherein, in a case of the internally caused disturbance, the disturbance compensation rate has a positive value that is inversely proportional to the disturbance frequency, and in a case of the externally caused disturbance, the disturbance compensation rate has a negative value only in a first disturbance frequency region.

4. The steering control apparatus of claim 1, wherein, when the disturbance compensation rate has a positive value, a final disturbance compensation current value, which is obtained by multiplying the main compensation current and the disturbance compensation rate, is subtracted from an auxiliary steering current value, and when the disturbance compensation rate has a negative value, a final disturbance compensation current value, which is obtained by multiplying the main compensation current and the disturbance compensation rate, is added to the auxiliary steering current value.

5. The steering control apparatus of claim 3, wherein the first disturbance frequency region is in a range of 20 Hz to 30 Hz.

6. The steering control apparatus of claim 1, further comprising:
   a Band Pass Filter (BPF) that is set to have the third estimated frequency as a central frequency, and has a pre-set margin frequency width on either side,
   wherein the BPF is configured to filter the main compensation current value and to provide the filtered main compensation current value to the final disturbance compensation circuit.

7. The steering control apparatus of claim 1, wherein the steering ECU is configured to
   calculate a steering angle gain that is inversely proportional to the steering angle and to reflect the steering angle gain to the generation of the final disturbance compensation current, and/or
   calculate a vehicle speed gain that is proportional to a vehicle speed and to reflect the vehicle speed gain to the generation of the final disturbance compensation current.

8. A method performed by a steering control apparatus of a vehicle, the steering control apparatus including a torque sensor, a steering motor, and a steering electronic control unit (ECU), the method comprising:
   generating, by the torque sensor, a steering torque signal based on a steering torque of a steering shaft connected to a steering wheel of the vehicle;
   estimating, by the steering ECU, a rack force based on a load applied to a rack bar of the vehicle;
   generating, by the steering ECU, a main compensation current value based on a change rate of the steering torque signal;

estimating, by the steering ECU, a rack force based on a load applied to the rack bar of the vehicle;

by the steering ECU, calculating a first estimated frequency based on the estimated rack force, calculating a second estimated frequency based on a front vehicle wheel rotational frequency, and calculating a third estimated frequency based on the steering torque signal;

identifying, by the steering ECU, a cause of the disturbance by comparing the first to third estimated frequencies;

calculating, by the steering ECU, a disturbance compensation rate, which varies depending on whether the disturbance is an internally caused disturbance or an externally caused disturbance; and generating, by the steering ECU, a final disturbance compensation current by reflecting the disturbance compensation rate to the main compensation current, wherein the steering motor moves the rack bar of the vehicle based on the generated final disturbance compensation current.

9. The steering control method of claim 8, wherein in the calculating the compensation rate, when the first estimated frequency and the second estimated frequency are equal to each other, or all the first to third estimated frequencies are equal to each other, it is determined that the disturbance is an internally caused disturbance, and when the first estimated frequency is equal to the third estimated frequency, but is different from the second estimated frequency, it is determined that the disturbance is an externally caused disturbance.

10. The steering control method of claim 8,
wherein the disturbance compensation rate has a value related to a disturbance frequency, and
wherein, in a case of the internally caused disturbance, the disturbance compensation rate has a positive value that is inversely proportional to the disturbance frequency, and in a case of the externally caused disturbance, the disturbance compensation rate has a negative value only in a first disturbance frequency region.

11. The steering control method of claim 8, wherein, in the generating a final disturbance compensation current, the steering apparatus is controlled in such a manner that, when the disturbance compensation rate has a positive value, a final disturbance compensation current value, which is obtained by multiplying the main compensation current and the disturbance compensation rate, from an auxiliary steering current value, and when the disturbance compensation rate has a negative value, a final disturbance compensation current value, which is obtained by multiplying the main compensation current and the disturbance compensation rate, is added to the auxiliary steering current value.

12. The steering control method of claim 8, further comprising:
calculating, by the steering ECU, a steering angle gain that is inversely proportional to the steering angle and to reflect the steering angle gain to the generation of the final disturbance compensation current; and/or
calculating, by the controller, a vehicle speed gain that is proportional to a vehicle speed and to reflect the vehicle speed gain to the generation of the final disturbance current.

* * * * *